US007590459B2

(12) United States Patent
Masuda

(10) Patent No.: US 7,590,459 B2
(45) Date of Patent: Sep. 15, 2009

(54) STREAM DATA PROCESSING SYSTEM, STREAM DATA PROCESSING METHOD, STREAM DATA PROCESSING PROGRAM, AND COMPUTER READABLE RECORDING MEDIUM FOR STORING STREAM DATA PROCESSING PROGRAM

(75) Inventor: Hideyuki Masuda, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 858 days.

(21) Appl. No.: 10/424,000

(22) Filed: Apr. 25, 2003

(65) Prior Publication Data

US 2004/0024574 A1 Feb. 5, 2004

(30) Foreign Application Priority Data

Apr. 26, 2002 (JP) ............................ 2002-126886

(51) Int. Cl.
*G06F 17/00* (2006.01)

(52) U.S. Cl. ........................................................ 700/94

(58) Field of Classification Search .................. 700/94; 84/600-605; 704/502-504; 381/58, 61; 709/232-235; 710/29; 714/51; 370/230, 370/516, 519; 708/290, 313
See application file for complete search history.

(56) References Cited

U.S. PATENT DOCUMENTS

| | | | | |
|---|---|---|---|---|
| 5,792,970 | A | 8/1998 | Mizobata | |
| 5,815,689 | A | 9/1998 | Shaw et al. | |
| 5,850,049 | A | 12/1998 | Kamiya | |
| 6,606,666 | B1 * | 8/2003 | Bell et al. | 709/232 |
| 6,785,230 | B1 | 8/2004 | Ogata | |
| 2001/0013270 | A1 | 8/2001 | Kumamoto et al. | |
| 2004/0215811 | A1 * | 10/2004 | Bar et al. | 709/232 |

FOREIGN PATENT DOCUMENTS

| | | |
|---|---|---|
| JP | 61156949 | 7/1986 |
| JP | 2001-45067 | 2/2001 |
| JP | 2001-156845 | 6/2001 |

OTHER PUBLICATIONS

Linda S. Cline et al., "DirectShow™ RTP Support For Adaptivity in Networked Multimedia Applications", Proceedings, IEEE International Conference on Multimedia Computing and Systems, 1998, Austin TX (Jun. 1-Jul. 1998), pp. 13-22.

* cited by examiner

*Primary Examiner*—Andrew C Flanders
(74) *Attorney, Agent, or Firm*—Morrison & Foerster LLP

(57) ABSTRACT

Musical sound data derived from the musical instrument (1) is outputted via a capture filter (21), and effector filter (22), a flow-rate monitoring filter (23), and a renderer filter (24) to a speaker (3). The flow-rate monitoring filter (23) counts a buffer number "Cr" under rendering process among a plurality of buffers 24*a* employed in the renderer filter (24), and then, feeds back this count result to the capture filter (21). The capture filter (21) deletes, or inserts data based upon this feedback information by way of an interpolation.

10 Claims, 5 Drawing Sheets

STREAM DATA PROCESSING SYSTEM, STREAM DATA PROCESSING METHOD, STREAM DATA PROCESSING PROGRAM, AND COMPUTER READABLE RECORDING MEDIUM FOR STORING STREAM DATA PROCESSING PROGRAM

BACKGROUND OF THE INVENTION

The present invention relates to a stream data processing system operable in such a way that stream data (moving picture data, musical sound data and the like) is entered (captured) thereinto from an input device, a certain process operation is carried out with respect to the captured stream data, and thereafter, the processed stream data is outputted from a separate output device from the input device, and further relates to a stream data processing method, stream data processing program, and computer readable recording medium for storing the stream data processing program.

While stream data such as multimedia data are processed, data stream is synchronized based upon certain timing information and is input and output, and processed. As the timing information, physical clocks, and time stamp information contained in certain stream data are provided.

On the other hand, in such stream data processing apparatus, there are possibilities that both input devices into which the stream data are entered, and output devices which output the inputted stream data to external devices are operated in response to different clocks from each other. For example, even if both the input device and the output device are to be operated in response to same clock of 44.1 kHz, there is a possibility that operating clock periods of the input device and the output device are slightly deviated each other due to using different oscillators. Accordingly, the clocks used for the input devices are not sometimes synchronized with the clocks used for the output devices. As a consequence, during data transmission between the devices, since data are overflown, or are conversely depleted, such a problem may occur. That is, output data may not own desirable formats.

These problems may also occur in a case that the stream data are constituted by software. Further, recently, in order to process stream data by personal computers (PCs) in software manners, in the operating system, for example, Windows 98 (registered trademark) provided by Microsoft corporation, the API (Application Program Interface) suitable for processing the stream data on the PCs has been proposed. That is, this API is referred to as “DirectShow (registered trademark)” system, and is utilized so as to connect the PCs to external appliances by employing USB (universal Seria Bus) and/or IEEE 1394 interfaces. In this “DirectShow” system, modules (called as “filters”) capable of executing certain process operations on data are mutually connected to each other in order to execute a desirable data processing operation.

In such a data processing system constituted by these mutually-connected software filters, in the case that the operating clocks of each filter are slightly deviated each other, output data may not have a desirable format due to overflow or depletion of the data.

In the case that a portion of these filters is formed in a user mode or in the case that the portion of the filters is formed in a kernel mode but priority thereof is low, output data may not have a desirable format due to overflow or depletion of the data. For example, in many of the cases, an effector filter contained in an audio data processing system is formed in a user mode since the system has an user interface function which allows the user to set effects. It should be noted that this “kernel mode” implies such an operation mode to which a very high priority is given in an operating system (OS) such as WINDOWS (registered trademark) of Microsoft Corporation, namely such an operation mode that a code can directly access all of hardware and also all of memories. On the other hand, this “user mode” implies such an operation mode whose priority is set to a low level in the OS such as WINDOWS (registered trademark), namely such an operation mode that a code cannot directly access hardware.

In this case, the below-mentioned problem may occur. That is, since the audio data transmission between a filter formed in a kernel mode and a filter formed in a user mode and/or between filters formed in the user mode takes large load for processing in comparison with the data transmission between the filters formed in the kernel mode, throughput of the effector filter varies due to influence from other task, and the audio data may be overflown, or depleted before/after the effector filter, so that stream data cannot be outputted in an ideal format, and/or noise may be produced.

Situation in which the throughput of the effector filter varies due to the influence from other task may be occurred in the case that data is created in low priority even if the filter is in the kernel mode.

To solve the above-described problem, for instance, Japanese Patent Publication No. Hei-10-283199 discloses the synchronizing apparatus. This conventional synchronizing apparatus is designed to minimize lag of the output timing of the plural stream data in such a manner that while this synchronizing apparatus owns three sets of different time values, i.e., the positional time value, the physical time value, and the relative time value, these three time values are commonly utilized in large numbers of devices. This positional time value corresponds to such a time value produced based upon time interval information related to a data stream, and reflects a position of the data stream to be processed. The physical time value corresponds to such a time value produced based upon a hardware oscillator, or a clock. The relative time value is to provide a designated time value such as the positional time value in connection with a reference time value.

However, this conventional synchronizing apparatus disclosed in the above-described Japanese Patent Publication can minimize deviation of input and output timing. However, since three different time values are used, complex control is needed for adjustment of processing rate, etc.

SUMMARY OF THE INVENTION

The present invention has been made to solve the above-explained problems, and therefore, has an object to minimize deviation of input/output timing without using complex construction for the clock control.

In order to solve the aforesaid object, the invention is characterized by having the following arrangement.

(1) A stream data processing system constructed of mutually-connected software filter, the mutually-connected software filter comprising:

a capture filter which holds stream data entered from external;

a renderer filter which outputs the stream data outside the mutually-connected software filters; and a flow-rate monitoring filter arranged between the renderer filter and the capture filter, which monitors a flow rate of the stream data flowing between the capture filter and the renderer filter, wherein the software filters adjust the flow rate based upon information related to the monitoring operation.

(2) The stream data processing system according to (1), wherein the flow-rate monitoring filter judges the flow rate based upon buffer information of a filter arranged at a post stage of the flow-rate monitoring filter.

(3) The stream data processing system according to (1), wherein the flow-rate monitoring filter feeds back information related to the flow rate of the stream data to the capture filter.

(4) The stream data processing system according to (3), wherein the capture filter partially deletes data from the stream data, or inserts data into the stream data based upon the information which is fed back, so that the software filters adjust the flow rate of the stream data.

(5) The stream data processing system according to (4), wherein the capture filter inserts or deletes the data by way of an interpolation.

(6) The stream data processing system according to (2), wherein the flow-rate monitoring filter acquires the buffer information under such a condition that outputting of the stream data to the filter arranged at the post stage is stopped.

(7) The stream data processing system according to (1), wherein the flow-rate monitoring filter judges the flow rate based on buffer information of a file created by a user mode.

(8) The stream data processing system according to (7), wherein the flow-rate monitoring filter feeds back information related to flow rate of the stream data to the capture filter, based on the fed-back information, the capture filter deletes a part of data from the stream data or inserts data into the stream data when the flow rate is lower than a predetermined values, and adjusts the flow rate of the stream data by executing thinning operation on the buffer.

(9) A stream data processing method of producing mutually-connected software filters to process stream data, the method comprising:

a step of producing a capture filter which holds externally-entered stream data;

a step of producing a renderer filter which outputs the stream data outside the mutually-connected software filters;

a step of producing a flow-rate monitoring filter arranged between the renderer filter and the capture filter, which monitors a flow rate of the stream data flowing between the capture filter and the renderer filter; and a step of adjusting the flow rate based upon information related to the monitoring operation.

(10) A computer readable recording medium storing a stream data processing program for producing mutually-connected software filters, which causes a computer to execute:

a step of producing a capture filter which holds externally-entered stream data;

a step of producing a renderer filter which outputs of stream data outside of mutually-connected software filters;

a step of producing a flow-rate monitoring filter arranged between the renderer filter and the capture filter, which monitors a flow rate of the stream data flowing between the capture filter and the renderer filter; and a step of adjusting the flow rate based upon information related to the monitoring operation.

DETAILED DESCRIPTION OF PREFERRED EMBODIMENTS

Next, an embodiment of the present invention will now be described with reference to drawings.

First Embodiment

Figure 1:
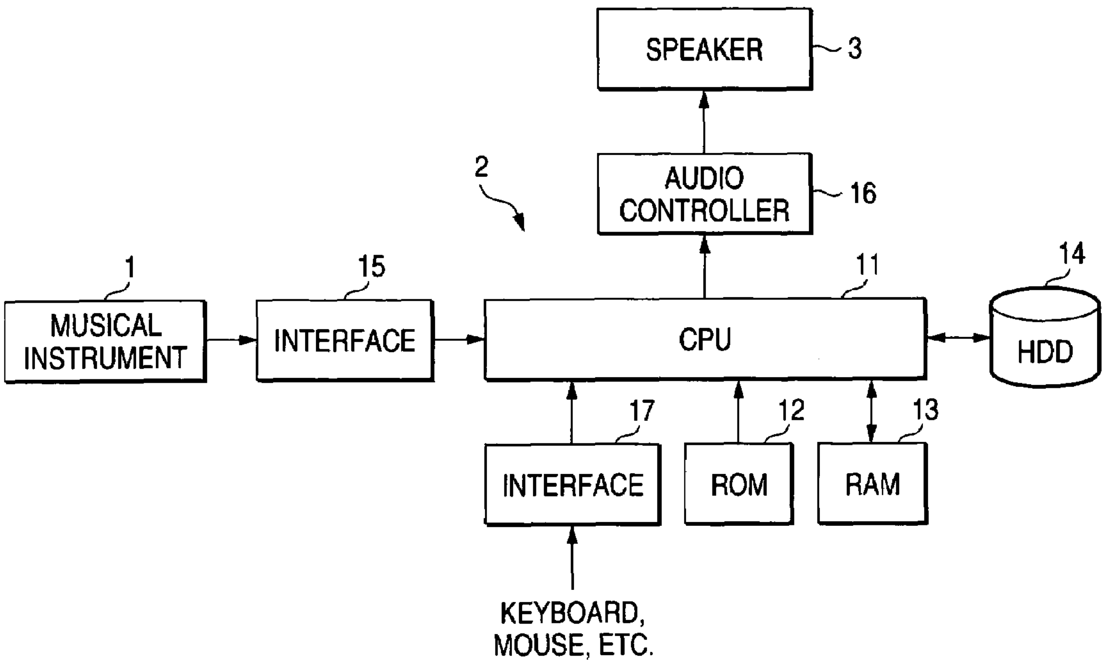
FIG. 1 shows an entire arrangement of a stream data processing system according to a first embodiment of the present invention.

FIG. 1 is a block diagram for indicating a hardware structure of a stream data processing system according to a first embodiment of the present invention. The stream data processing system according to the embodiment is established by such an assumption. That is, in this embodiment, stream data corresponds to musical sound data outputted from such a musical instrument as an electric guitar and an electronic piano. This stream data (musical sound data) is processed by a personal computer (PC) 2, and then, the processed stream data is outputted from a speaker 3. The personal computer (PC) 2 contains a CPU 11, a ROM 12, a RAM 13, a hard disk drive (HDD) 14, and the like. The CPU 11 may execute various sorts of programs under control of an operating system (OS).

The ROM 12 is a nonvolatile memory which stores thereinto a boot program initiated when a power supply is turned ON, and other data/programs. The RAM 13 temporarily stores thereinto various sorts of activated programs, and also provides work areas used to process various sorts of data. The HDD 14 corresponds to a drive apparatus capable of driving a magnetic disk used to store thereinto the operating system and various sorts of programs.

An interface (I/F) 15 converts the musical sound data derived from the musical instrument 1 based upon a predetermined system and then outputs the converted musical sound data to the CPU 11. An audio controller 16 corresponds to a control apparatus for executing an output processing operation of a musical sound signal. Input data entered from various sorts of input apparatus (mouse, keyboard, and the like) is inputted via the I/F 17 to the CPU 11.

Figure 2:
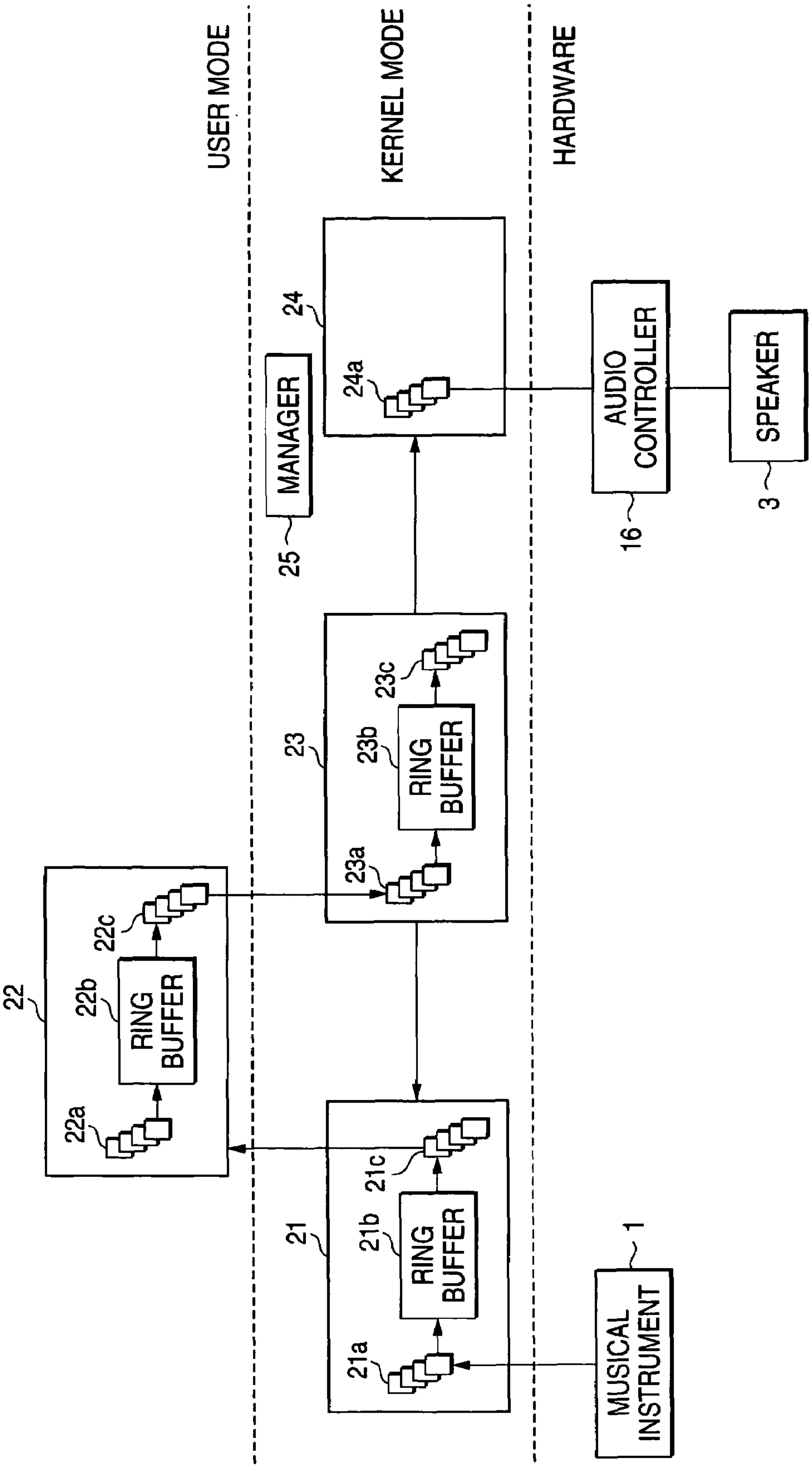
FIG. 2 indicates a software structure of the stream data processing system shown in FIG. 1.

Next, a description is made for a software structure of a program executed by the PC 2. FIG. 2 shows the software structure of the program executed by the PC 2, while including a correspondence relationship with respect to the hardware structure. In this embodiment, such an assumption is made that stream data is processed based upon such an API (Application Program Interface) called as the "DirectShow (registered trademark)" system of Microsoft Corporation.

In the structure of the "DirectShow" system, software is constituted by producing a plurality of objects which is referred to as "filters", and also, the respective filters are connected to each other by architecture called as a "filter graph" (not shown). Concretely speaking, as indicated in FIG. 2, the software according to the embodiment is arranged by a capture filter 21, an effector filter 22, a flow-rate monitoring filter 23, and a renderer filter 24. Although, in this example, the effector filter 22 is formed in a user mode and the remaining filters are formed in a kernel mode, the effector filter 22 may be formed in the kernel mode. In the first embodiment, the filters 21 to 24 are set to be operated under predetermined clock of same frequency, however, in the frequency of the actual clock, slight deviation exists among the filters due to various error factors.

The capture filter 21 has such a function that musical sound data entered from the musical instrument 1 is acquired, and the acquired musical sound data is converted into such a format data capable of being recognized by the effector filter 22 and other filters provided at a post stage, and then, this format data is outputted. The capture filter 21 is provided with a USB buffer 21*a*, a ring buffer 21*b*, and an output queuing buffer 21*c*.

The musical sound data derived from the musical instrument 1 is firstly buffered by the USB buffer 21*a*, and then, is sequentially transferred to the ring buffer 21*b* and the output queuing buffer 21*c*. The ring bugger 21*b* is used for processing such as format conversion of input data. The structure of the output queuing buffer 21*c* may be changed in various manners. In this embodiment, the structure of this output queuing buffer 21*c* is made of such an assumption that 8 pieces of 1024-bit buffers are allocated thereto.

The effector filter 22 is employed so as to apply an arbitrary change to the musical sound data outputted from the capture filter 21. This effector filter 22 is equipped with an input buffer 22*a*, a ring filter 22*b*, and an output queuing buffer 22*c*. A structure of the input buffer 22*a* may be made similar to the structure of the output queuing buffer 21*c* employed in the capture filter 21 at a prestage of this input buffer 22*a*. The input buffer 22*a* transfers/receives buffered data with respect to the output queuing buffer 21*c* based on a predetermined clock. Then, the musical sound data is sequentially transferred from the input buffer 22*a* via the ring buffer 22*b* to the output queuing buffer 22*c*. The ring buffer 22*b* is used for processing such as format conversion of input data. A structure of the output buffer 22*c* may be made similar to the structures of the output queuing buffer 21*c* and the input buffer 22*a*. Since this effector filter 22 is formed in various structures in order to meet various requirements of users, and also, corresponds to such a software structural portion which is directly operated by the users, in many of cases, this effector filter 23 is normally formed in the user mode.

The flow-rate monitoring filter 23 is connected between the effector filter 22 and the renderer filter 24. This flow-rate monitoring filter 23 is equipped with an input buffer 23*a*, a ring filter 23*b*, and an output queuing buffer 23*c*. Both a structure of the input buffer 23*a* and a structure of the output buffer 23*c* may be made similar to the structures of the input buffer 22*a* and the output buffer 22*c*. The input buffer 23*a* transfers/receives buffed data with respect to the output queuing buffer 22*c* employed in the effector filter 22 provided at a prestage thereof based on a predetermined clock. Subsequently, the data transfer operation is sequentially carried out from the input buffer 23*a* via the ring buffer 23*b* to the output queuing buffer 23*c*.

The flow-rate monitoring filter 23 owns such a function capable of monitoring a flow rate of data contained in a data stream of the stream data processing system constituted by the filters 21 to 24, and of outputting (feeding back) a monitoring result to the capture filter 21 and/or the effector filter 22. A detailed function of this flow-rate monitoring filter 23 will be explained later.

The renderer filter 24 corresponds to a filter used to output such stream data having a format recognizable by an audio controller 16, and is equipped with a buffer 24*a* for buffering thereinto data to be rendered. A structure of the buffer 24*a* may be made similar to that of the output queuing buffer 23*c* and the like provided at the prestage thereof. The buffer 24*a* transfers/receives buffered data with respect to the output queuing buffer 23*c*, and properly outputs data to the audio controller 16 based on a predetermined clock.

Incidentally, as mentioned above, the filters 21 to 24 are driven by basically same operating clock, however due to various error factors, slight deviation between frequencies may be occurred. In the case that the deviation exists and the flow rate is high, when the data are transferred and received between the buffer of the upper filer and the buffer of the lower filter, the data is not pooled in the input buffer of the lower filter but pooled in the output queuing butter of the upper filter.

A manager 25 corresponds to such a software structural portion capable of managing data transmission operations among the respective filters, for instance, controlling monitoring timing of the flow-rate monitoring filter 23, and controlling stream data outputted from the capture filter 21 and stream data inputted/outputted into/from the renderer filter 24 based upon information related to the monitoring operation, e.g., monitoring results and the like.

Figure 3:
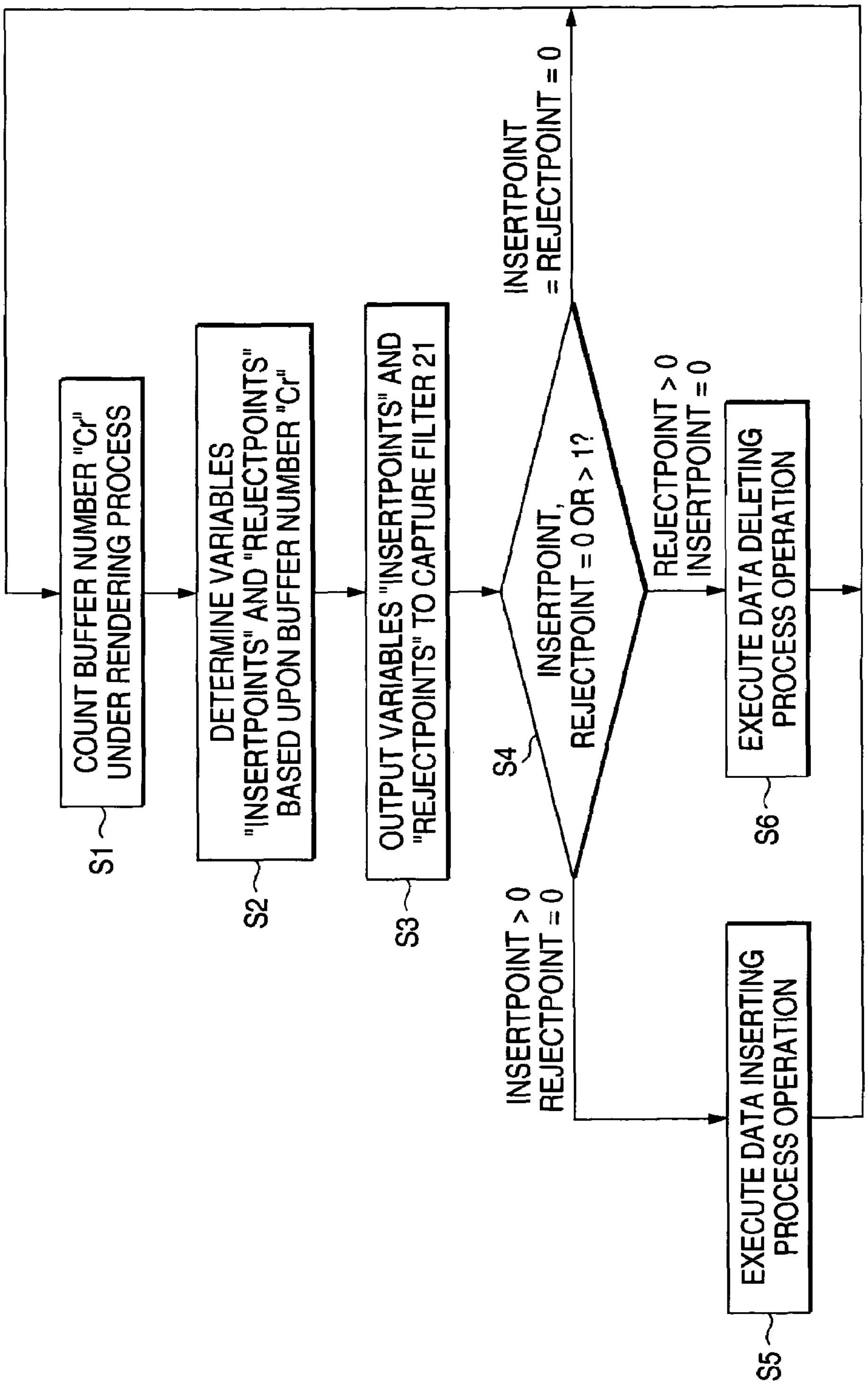
FIG. 3 is a flow chart for describing operations of the stream data processing system shown in FIG. 1.

Next, operations of the stream data processing system according to this embodiment will now be explained based upon a flow chart shown in FIG. 3.

The stream data processing program is read out from the HDD 14, and thus, the capture filter 21, the ejector filter 22, the flow-rate monitoring filter 23, the renderer filter 24, and the like are produced. Then, when the musical sound data is entered from the musical instrument 1 to the PC 2, this musical sound data is transferred through the capture filter 21, the ejector filter 22, the flow-rate monitoring filter 23, and the renderer filter 24 in this order, and then, the filtered musical sound data is outputted.

During this process operation, the flow-rate monitoring filter 23 counts a total number "Cr" of buffers under rendering process among the plural filters 24*a* provided in the renderer filter 24 (step S1).

A reason why the number "Cr" of buffers under rendering process in the input buffer 24*a* is counted is because, in the case that the difference between clock of the capture filter 21 and clock of the renderer filter 24 exists, influence thereof is more likely to be reflected. That is, when the clock of the capture filter is faster than the clock of the renderer clock, data is been pooled in the output queuing buffer 23*c* and number of the renderer filter which is in the rendering process decreases. In this case, determination is made so that flow data is high. On the other hand, when the clock of the capture filer is slower than the clock of the renderer clock, data pooled in the output queuing buffer 23*c* gets less and number of the renderer filter which is in the rendering process increases. In this case, determination is made so that the flow data is low. Therefore, based upon a count result of the buffer number "Cr" in the rendering process, this flow-rate monitoring filter 23 changes variables of "insertpoints" and "rejectpoints", which control a data flow rate.

Counting the number "Cr" of the buffers under the rendering process in the buffer 24*a* may be performed by counting the number of output queuing buffer 23*c* in the flow-rate monitoring filter 23. However, it is difficult to estimate how many of buffers in the rendering process complete rendering. Therefore, time Tw from buffer being entered into queue of the output queuing buffer 23*c* of the flow-rate monitoring filter 23, to the buffer being output to renderer filter 24 is used to compute (count) the number "Cr" of buffer in the rendering process in the buffer 24*a*. When the time Tw is large, the number of the output queuing buffer 23*c* of the flow-rate monitoring filter 23 is large, that is, the buffer number Cr in the operation of the rendering process is small. When the Tw is small, the number of the output queuing buffer 23*c* of the flow-rate monitoring filter 23 is small, that is, the buffer number Cr in the rendering process is large.

In the case that the buffer number "Cr" is measured, when the stream of the flow-amount monitoring filter 23 is initiated, while data is not firstly sent to the renderer filter 24 provided at a down stream, the flow-rate monitoring filter 23 counts a total number of buffers which are queued in the output queuing buffer 23*c*, and a count value when the buffer does not carry out the queuing operation for a predetermined time period is determined as a buffer total number Cb which is used for the data transmission between the output queuing buffer 23*c* and the renderer filter 24.

The buffer number "Cr" under rendering process may be calculated as follows:

$$Cr=Cb-Tw\times R/Lb \quad \text{(Formula 1)}$$

It should be noted that:

symbol "Lb": a buffer data length of each buffer 24*a*; and symbol "R": a typical value of a transfer data number for each unit time corresponding to a data period of, for instance, inputted stream data.

In this case, assuming now that the value of time "Tw" is obtained by performing, for example, the moving average method approximately 10 times, the buffer number "Cr" can be calculated in higher precision.

After the buffer number "Cr" has been calculated, the flow-rate monitoring filter 23 determines both the variable "insertpoints" and the variable "rejectpoints" based upon this calculated value "Cr" (step S2). As to the variables "insertpoints" and "rejectpoints", in such a case that the buffer number "Cr" is present within a predetermined range and a data flow rate is a proper flow rate other than over/short flow rates, these variables are set as follows: "insertpoints"=0 and "rejectpoints"=0. In the case that the buffer number "Cr" is larger than the predetermined range and the data flow rate becomes short, the variable is set as "insertpoints">0 and "rejectpoints"=0, whereas in the case that the buffer number "Cr" is smaller than the predetermined and the data flow rate becomes over, the variable is set as "insertpoints"=0 and "rejectpoints">0.

The flow-rate monitoring filter 23 outputs these variables "insertpoints" and "rejectpoints" to the capture filter 21 (step S3).

The capture filter 21 judges whether the variables "insertpoints" and rejectpoints" is equal to or larger than 0 (step S4).

In such a case that the variable "insertpoints">0, the capture filter 21 executes a data inserting process operation for inserting data (step S5). In other words, in such a case that a total data number of a data stream "S" of a constant section is assumed as "N", which has been captured by the USB buffer 21*a* of the capture filter 21, a total data number "M" of a newly produced data stream "C" is defined as M=N+p.

On the other hand, in the case of the variable "rejectpoints">0, the capture filter 21 executes a data deleting process operation for deleting data (step S6). In other words, in such a case that a length of the data stream "S" of the constant section is assumed as "N", which has been captured by the capture filter 21, a length "M" of the newly-produced data stream "C" is defined as M=N−p. In such a case that the process operations defined in the steps S4 and S5 are accomplished, the process operation is returned to the previous step S1 in which the counting operation of the buffer number "Cr" is again carried out.

Next, a description will now be made of a method for adding and deleting data by way of a data interpolation by the capture filter 21 with reference to FIG. 4.

Figure 4:
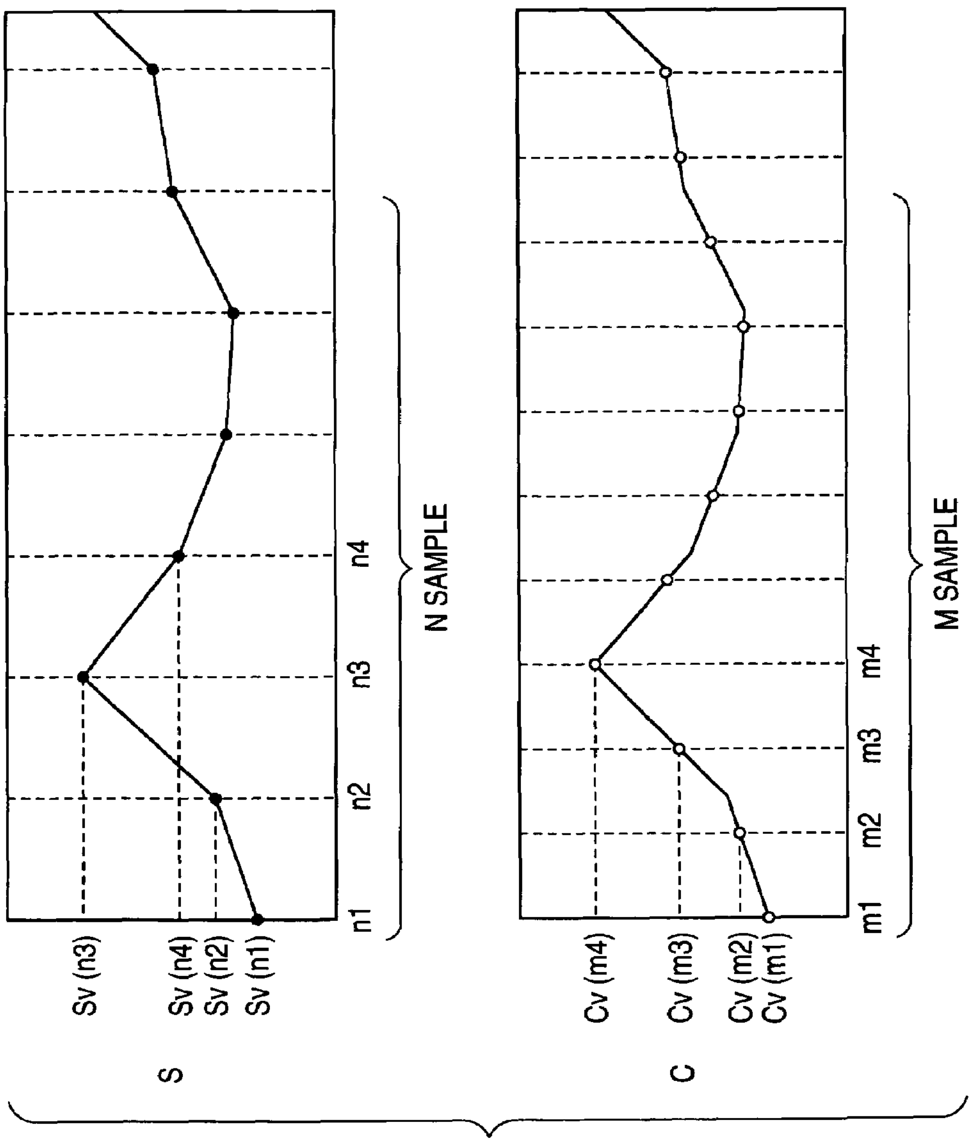
FIG. 4 graphically shows a method of inserting/deleting data contained in a data stream.

In such a case that the original data stream "S" contains data about "N" samples within one section, as indicated in FIG. 4, the following data stream producing operation will now be considered. In this data stream producing operation, the capture filter 21 interpolates "p" pieces of data so as to produce a new data stream "C" which contains "M" samples (M=N+p) of data within one section.

At this time, a new sampling point m(i) in the newly produced data stream "C" can be expressed in the following formula 2 in a relationship between this new sampling point "m(i)" and an original sampling point "n(i)":

$$m(i)=N/M\times n(i)\ (i=1, 2 \ldots N) \quad \text{(Formula 2)}$$

Data values at these new sampling points are calculated by employing the linear interpolation method based upon the data of the original sampling point. In other words, a data value "Cv (m(i))" at the sampling point "m(i)" is expressed by the following formula 3 in such an assumption case that this sampling point "m(i)" is located between data "n(k)" and another data "n(k+1)" contained in the data stream "S"

$$Cv(m(i))=(Sv(n(k))\times(n(k+1)-m(i))+Sv(n(k+1)\times(m(i)-n(k)))/(n(k+1)-n((k)) \quad \text{(Formula 3)}$$

In particular, in such a case of n(k+1)=n(k)+1, data value "Cv (m(i))" is expressed by the following formula 4:

$$Cv(m(i))=Sv(n(k))\times(1-(m(i)-n(k)))+Sv(n(k+1))\times(m(i)-n(k)) \quad \text{(Formula 4)}$$

As previously explained, in the stream data processing system according to the embodiment, the buffering condition of the buffer 24*a* employed in the renderer filter 24 is monitored by the flow rate monitoring filter 23, and then, the data is deleted or inserted by way of the interpolation method in the capture filter 21 based upon the monitoring result. As a consequence, there is no such a condition that the data stream is overflown and/or is depleted which is caused by a difference of clock cycle of the capture filter and the renderer filter.

The data may be deleted at the flow-rate monitoring filter 23. In this case, process of deletion and insertion of the data received from the input buffer 23*a* is carried out by using the ring buffer 23*b*, and the processed data is transmitted to the output queuing buffer 23*c*.

In order to easily execute process operations in the PC 2, the interpolation data may be alternatively obtained by way of an integer calculation. In other words, for example, a data stream between the data n(k) and the data n(k+1) is subdivided into 4,096 points, and then, the integer calculation may be carried out as follows:

$$Cv(m(i))=(Sv(n(k)\times(4096-R)+Sv(n(k+1))\times R)/4096 \quad \text{(Formula 5)}$$

Note that: R=(N/M×n(i)×4096) mod 4096

Second Embodiment

Figure 5:
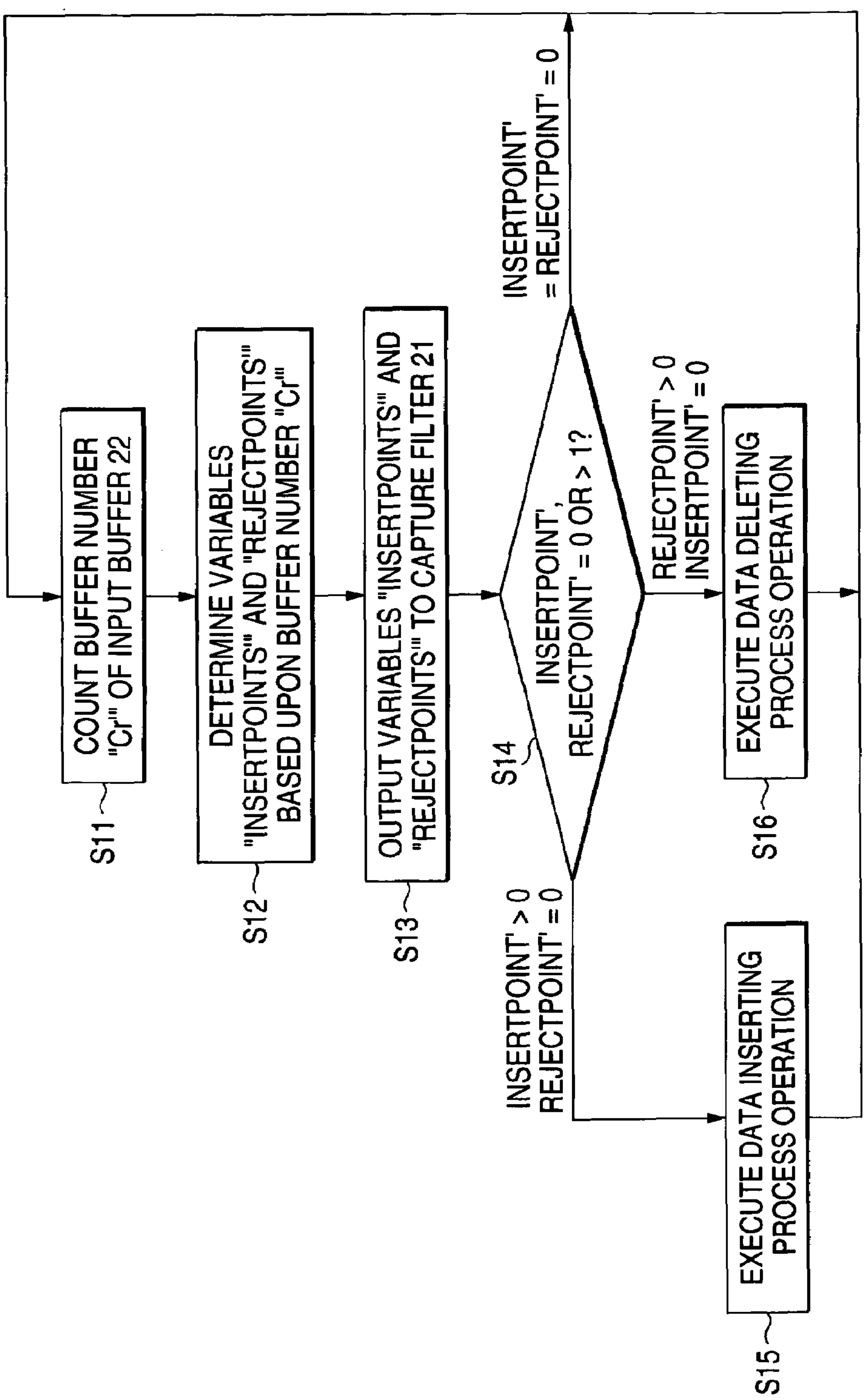
FIG. 5 is a flow chart for describing operations of the stream data processing system according to a second embodiment of the present invention.

Next, a second embodiment according to the present invention will be described with reference to FIG. 5. Filter construction of the second embodiment is similar to that of the first embodiment (FIG. 2), however, different from the first embodiment in that instead of the flow-rate monitoring filter 23 monitoring the input buffer 24*a* of the renderer filter 24, the flow-rate monitoring filter 23 monitors the number "Cr'" of the buffer of the input buffer of the effector filter formed in the user mode, and deletes or insets the data in the capture filter 21 by way of the interpolation method based on the number "Cr'" of the buffer.

Operation of the second embodiment will be described based on a flow chart shown in FIG. 5.

The flow-rate monitoring filter 23 counts the number "Cr'" of the plural input buffers in the effector filter 22 (step S11).

After the buffer number "Cr'" has been calculated, the flow-rate monitoring filter 23 determines both the variable "insertpoints" and the variable "rejectpoints" based upon this calculated value "Cr'" (step S12). As to the variables "insertpoints" and "rejectpoints", in such a case that the buffer number "Cr'" is present within a predetermined range and a data flow rate is a proper flow rate other than over/short flow rates, these variables are set as follows: "insertpoints"=0 and "rejectpoints"=0. In the case that the buffer number "Cr'" is larger than the predetermined range and the data flow rate becomes short, the variable is set as "insertpoints">0 and "rejectpoints"=0, whereas in the case that the buffer number "Cr'" is smaller than the predetermined and the data flow rate becomes over, the variable is set as "insertpoints"=0 and "rejectpoints">0.

The flow-rate monitoring filter 23 outputs these variables "insertpoints" and "rejectpoints" to the capture filter 21 (step S13).

The capture filter 21 judges whether the variables "insertpoints" and/or "rejectpoints" is equal to or larger than 0 (Step S14). In the case of "insertpoint">0 and "rejectpoint"=0, the capture filter 21 executes data inserting process for inserting data (Step S15). That is, in such a case that data number of a data stream "S" of a constant section in the USB buffer 21*a* of the effector filter 22 is assumed as "N", the data number "M" of data stream C which is newly produced is defined as M=N+p.

On the other hand, in the case of "insertpoint"=0 and "rejectpoints">0, the capture filter 21 executes a data deleting process operation for deleting data (step S16). In other words, in such a case that a length of the data stream "S" of the constant section is assumed as "N", which has been captured by the capture filter 21, a length "M" of the newly-produced data stream "C" is defined as M=N−p. In such a case that the process operations defined in the steps S15 and S16 are accomplished, the process operation is returned to the previous step S1 in which the counting operation of the buffer number "Cr" is again carried out. A method of adding and deleting data in the capture filter 21 by way of the interpolation method is same as the method described in the first embodiment (FIG. 4).

In the effector filter 22, overflow or depletion of data tends to be occurred since the throughput changes by the influence of another task. Particularly, in the case that the effector filter 22 is formed in the user mode or is formed in the kernel mode but the priority thereof is low, the tendency of the overflow and depletion is high. Therefore, in the second embodiment, when the flow rate is lower than a predetermined value, the above-mentioned data inserting process or data deleting process is executed, and when the flow rate is higher than a predetermined value, in addition to the data adding process or the data deleting process by the data interpolation method, thinning operation for thinning the buffer itself is executed. At this time, to remove noise, preferably, cross-fading processing or the like may be executed at front of rear of the section corresponding to the deleted buffer. Incidentally, the process for thinning the buffer itself may be executed at the effector filter 22.

The above-described embodiment has described such a case that the musical sound data is processed as one example of the stream data, but the present invention is not limited thereto. For instance, the present invention may be alternatively applied to such a case that picture data is processed. Apparently, the present invention may be applied to such a case that a composite signal made of musical sound data and picture data, such as picture information equipped with acoustic data (effect sound), is processed.

In the embodiment, the capture filter 21, the effector filter 22, the flow-rate monitoring filter 23 and the renderer filter 24 are provided, and the flow-rate monitoring filter 23 is provided at prestage of the renderer filter. However the flow-rate monitoring filter does not have to be provided at prestage of the renderer filter, and another filter other than the filter described above may be provided between the flow-rate monitoring filter 24 and the renderer filter 24. However it is desirable that the flow-rate monitoring filter 23 is provided at a prestage of the filter to be monitored and located as near as possible to the renderer filter.

Although the linear interpolation method has been utilized as the data interpolation method in the above-described embodiment, other interpolation methods may be utilized, for example, the Lagrange's interpolation method and the spline interpolation method may be used.

The USB buffer 21*a* has been used in the above-described embodiment. Alternatively, other buffers such as an IEEE1394 interface may be employed.

As previously described, in accordance with the represent invention, the delays occurred in the input/output timing of the stream data can be minimized.

What is claimed is:

1. A stream audio data processing system constructed of mutually-connected software filters, the mutually-connected software filter comprising:

a capture filter which holds stream audio data entered from an external data source, said capture filter samples an original data stream at a first sampling rate;

a renderer filter which outputs the stream audio data outside the mutually-connected software filters;

an effecter filter which applies arbitrary change to the stream audio data output from the capture filter;

a flow-rate monitoring filter arranged between the renderer filter and the capture filter, which monitors a flow rate of the stream audio data flowing between the capture filter and the renderer filter, wherein the capture filter sets a new sampling rate and adjusts the new sampling rate of the original data stream by increasing or decreasing the number of sampling points of original data stream within a predetermined section held by the capture filter and generates new data stream based on the adjusted new sampling rate at new sampling points according to the increased or decreased number so as to adjust the flow rate; and an output device that outputs the flow-rate adjusted stream audio data, wherein the capture filter inserts additional data or deletes portion of the stream audio data by way of an interpolation.

2. The stream audio data processing system according to claim 1, wherein the renderer filter is arranged post stage of the flow rate monitor filter, and wherein the flow-rate monitoring filter judges the flow rate based upon buffer information of the renderer filter, wherein the buffer information includes the number of buffers under a rendering process.

3. The stream audio data processing system according to claim 1, wherein the flow-rate monitoring filter feeds back information related to the flow rate of the stream audio data to the capture filter.

4. The stream audio data processing system according to claim 3, wherein the capture filter increases or decreases the number of sampling points based upon the information which is fed back, so that the software filters adjust the flow rate of the stream audio data.

5. The stream audio data processing system according to claim 2, wherein the renderer filter is arranged post stage of the flow rate monitor filter, and wherein the flow-rate monitoring filter stops outputting the stream audio data to the renderer filter and acquires the buffer information under such a condition that outputting of the stream audio data to the renderer filter is stopped.

6. The stream audio data processing system according to claim 1, wherein the flow-rate monitoring filter judges the flow rate based on the buffer information of the effecter filter, wherein the buffer information includes the number of buffers under a rendering process.

7. The stream audio data processing system according to claim 6, wherein the flow-rate monitoring filter feeds back information related to flow rate of the stream audio data to the capture filter, and wherein based on the fed-back information, the capture filter deletes a portion of the stream audio data when the flow rate is larger than a predetermined value or inserts additional data into the stream audio data when the flow rate is lower than a predetermined value, and adjusts the flow rate of the stream audio data by executing thinning operation on the buffer.

8. A computer-implemented stream audio data processing method of producing mutually-connected software filters to process stream audio data, the method performed by a computer having a computer-readable recording medium that includes a set of executable instructions for causing a processor to perform the method, said method comprising:

a step of providing a capture filter which holds externally-entered stream audio data;

using the capture filter to sample an original data stream at a first sampling rate;

a step of providing an effecter filter which applies arbitrary change to the stream audio data output from the capture filter;

a step of providing a renderer filter which outputs the stream audio data to which the arbitrary change is applied by the effecter filter outside the mutually-connected software filters;

a step of providing a flow-rate monitoring filter arranged between the renderer filter and the capture filter, which monitors a flow rate of the stream audio data flowing between the capture filter and the renderer filter;

a step of, using the processor, setting a new sampling rate of the original data stream, and adjusting the new sampling rate by increasing or decreasing the number of sampling points of the original data stream within a predetermined section held by the capture filter, and generating new data stream based on the adjusted new sampling rate at new sampling points according to the increased or decreased number based upon information related to the monitoring operation so as to adjust the flow rate; and a step of, using the processor, outputting the flow-rate adjusted stream audio data.

9. A computer readable recording medium storing a stream audio data processing program for producing mutually-connected software filters, which causes a computer to execute:

a step of providing a capture filter which holds externally-entered stream audio data;

using the capture filter to sample an original data stream at a first sampling rate;

a step of providing an effecter filter which applies arbitrary change to the stream audio data output from the capture filters a step of providing a renderer filter which outputs of stream audio data to which the arbitrary change is applied by the effecter filter outside of mutually-connected software filters;

a step of providing a flow-rate monitoring filter arranged between the renderer filter and the capture filter, which monitors a flow rate of the stream audio data flowing between the capture filter and the renderer filter;

a step of setting a new sampling rate of the original data stream, and adjusting the new sampling rate by increasing or decreasing the number of sampling points of the original data stream within a predetermined section held by the capture filter, and generating new data stream based on the adjusted new sampling rate at new sampling points according to the increased or decreased number based upon information related to the monitoring operation so as to adjust the flow rate; and a step of outputting the flow-rate adjusted stream audio data.

10. The stream audio data processing system according to claim 1, wherein the data is transmitted to the renderer filter through the flow-rate monitoring filter.

* * * * *